United States Patent
Cattaneo et al.

(10) Patent No.: US 7,254,202 B2
(45) Date of Patent: Aug. 7, 2007

(54) METHOD OF SYNCHRONIZING AN INDEPENDENT DATA DEVICE OF A WIRELESS DATA COMMUNICATIONS SYSTEM ON AN INCIDENT PULSED SIGNAL OF THE ULTRA WIDE BAND TYPE, AND CORRESPONDING INDEPENDENT DATA DEVICE

(75) Inventors: Chiara Cattaneo, Sergy (FR); Nils Rinaldi, Lausanne (CH); Matteo Frigerio, Albavilla (IT); Régis Cattenoz, Annemasse (FR)

(73) Assignee: STMicroelectronics N.V., Amsterdam (NL)

( * ) Notice: Subject to any disclaimer, the term of this patent is extended or adjusted under 35 U.S.C. 154(b) by 693 days.

(21) Appl. No.: 10/814,824

(22) Filed: Mar. 31, 2004

(65) Prior Publication Data

US 2004/0240597 A1  Dec. 2, 2004

(30) Foreign Application Priority Data

Apr. 1, 2003  (EP) .................................. 03290813

(51) Int. Cl.
*H04L 7/00*  (2006.01)
(52) U.S. Cl. ...................................... 375/354; 375/340
(58) Field of Classification Search ................ 375/354, 375/316, 343, 340
See application file for complete search history.

(56) References Cited

U.S. PATENT DOCUMENTS 6,463,107 B1 * 10/2002 Lindoff et al. .............. 375/343

6,925,131 B2 * 8/2005 Balakrishnan et al. ...... 375/299
2002/0181407 A1 * 12/2002 Khullar et al. .............. 370/252

FOREIGN PATENT DOCUMENTS

WO  02/052740  7/2002
WO  03/009608  1/2003

OTHER PUBLICATIONS

Win et al., Ultra-Wide Bandwidth Time-Hopping Spread-Spectrum Impulse Radio for Wireless Multiple-Access Communications, IEEE Transactions on Communications, IEEE Inc., New York, US, vol. 48, No. 4, Apr. 2000, pp. 679-691, XP000932191.

* cited by examiner

*Primary Examiner*—Emmanuel Bayard
(74) *Attorney, Agent, or Firm*—Lisa K. Jorgenson; Allen, Dyer, Doppelt, Milbrath & Gilchrist, P.A.

(57) ABSTRACT

An incident signal contains a preamble including a training sequence having a series of pulses whose polarity and time shifts are defined by respective polarity code and time-hopping code. A method includes a digital cross-correlation of the received signal with the training sequence. The cross-correlation algebraically sums in accordance with the polarity code windows of the received signal. The starting points of the windows are determined by the time-hopping code. The cross-correlation further includes detecting the end point of the preamble from the result of the digital cross-correlation. When the size of the receiving buffer, i.e., the size of the window is smaller than the number N of samples of each replica of the training sequence, it is particularly advantageous that the digital cross-correlation be performed iteratively in a block-by-block fashion. The computation of each block is split into M slices which are computed by algebraically summing windows N/M samples long.

36 Claims, 10 Drawing Sheets

METHOD OF SYNCHRONIZING AN INDEPENDENT DATA DEVICE OF A WIRELESS DATA COMMUNICATIONS SYSTEM ON AN INCIDENT PULSED SIGNAL OF THE ULTRA WIDE BAND TYPE, AND CORRESPONDING INDEPENDENT DATA DEVICE

FIELD OF THE INVENTION

The invention relates in general to sliding correlations as used in the communications field, and more particularly, in ultra wide band (UWB) radio technology for synchronizing a receiver on an incident signal. An example application of the invention is in the area of wireless personal area networks (WPAN) used to convey information over a relatively short distance among a relatively few participants.

BACKGROUND OF THE INVENTION

An example wireless personal area network is a piconet, which is a wireless data communications system that allows a number of independent data devices to communicate with each other. A piconet is distinguished from other types of data networks in that communications are normally confined to a person or object that typically covers about 10 meters in all directions, and envelops the person or object whether stationary or in motion.

Ultra wide band radio technology departs from conventional narrow band radio and spread-spectrum technologies in that the bandwidth of the signal at −10 db is typically greater than 20% of the center frequency. Instead of transmitting a continuous carrier wave modulated with information or with information combined with a spread code, which determines the bandwidth of the signal, a UWB radio transmits a series of very narrow impulses. For example, these impulses can take the form of a single cycle or monocycle, and have pulse widths less than 1 ns. These short time-domain impulses transformed into the frequency domain result in the ultra wide band spectrum of UWB radio technology.

In UWB radio technology, the information conveyed on the signal can be coded by pulse position modulation (PPM). In other words, information coding is performed by altering the timing of the individual pulses. More precisely, the series of impulses is transmitted at a repetition rate of up to several megahertz. Each pulse is transmitted within a window having a predetermined length (pulse repetition period), for example 50 ns. With respect to a nominal position, the pulse is in an early position or in a late position, which permits encoding of a 0 or a 1. It is also possible to encode more than two values by using more than two positions shifted with respect to the nominal position. It is also possible to superimpose a modulation of the BPSK type on this position modulation. More generally, any modulation can be used.

The IEEE 802.15.3 MAC standard defines the wireless medium access control specifications for high rate wireless personal area networks (WPAN) in narrow band radio technology. However, up to now, no document defines the specification of a wireless data communication system, for example, a wireless personal area network using UWB radio technology, and more particularly, the synchronizing of two independent data devices of such a network communicating with each other with one of the devices acting as a coordinator of the network.

SUMMARY OF THE INVENTION

An object of the invention is to provide an efficient way of implementing a synchronization phase, and more particularly but not exclusively, a coarse synchronization phase between a coordinator of the network and an independent data device. In particular, the synchronization requires very low complexity for digital data processing, and can be implemented in very low cost receivers having a reduced size receiving buffer.

This and other objects, advantages and features in accordance with the invention are provided by a method of synchronizing an independent data device of a wireless data communication system on an incident pulsed signal of the ultra wide band type received from a channel by the independent data device. The incident signal may contain a preamble including a preferably periodic training sequence having a series of pulses whose polarity and time shifts are defined by respective polarity code and time-hopping code.

The method may comprise a digital cross-correlation of the received signal with the training sequence. The cross-correlation step may include algebraically summing in accordance with the polarity code windows of the received signal, with the starting points of the windows being determined by the time-hopping code. The method may also comprise a detection step for detecting the end point of the preamble from the result of the cross-correlation.

The size of the windows is the factor that constrains the buffer size used in the reception for storing the received samples. According to an embodiment of the invention, in which the training sequence is periodic and comprises replicas, each having a size of N samples and containing L pulses, and each window having a size of N samples, the digital cross-correlation is performed iteratively in a block-by-block fashion until a stop criterion is reached. The starting points of two consecutive blocks of correlation are separated by 2N samples.

For each iteration, the digital cross-correlation may comprise: a) initializing the content of an accumulation register capable of storing N data; b) taking a first group of N samples of the received signal starting from the starting point of the corresponding block increased by the time shift of the first pulse; c) multiplying the first group by the polarity of the first pulse; d) adding the resulting group of N samples to the content of the accumulation register; and repeating sub-steps b) to d) for all the L pulses.

However, in some cases, the requirements of the size of the receiving buffer could still be too large for very low cost receivers. Accordingly, when the size of the receiving buffer, i.e., the size of the window is smaller than N, it is particularly advantageous that the digital cross-correlation be performed iteratively in a block-by-block fashion until a stop criterion is reached. The computation of each block is split into M slices which are computed by algebraically summing windows N/M samples long.

In such a case, the training sequence may comprise at least M+1 replicas, with each replica having a size of N samples and containing L pulses, and with M being a sub-multiple of N greater than or equal to 2. The incident signals may carry information within a super frame or frame structure. Each super frame or frame containing the preamble includes at least M+1 synchronization slots corresponding respectively to the replicas of the training sequence. Depending on the signal-to-noise ratio, one synchronization slot may be sufficient to test a single slice.

In other words, in some cases, especially with a sufficiently high signal-to-noise ratio, each slice can be computed using one synchronization slot. In such a case, and according to an embodiment of the invention, the digital cross-correlation may be performed iteratively in a block-by-block fashion until a stop criterion is reached. The starting points of two consecutive blocks of correlation are separated by N+N/M samples. For each iteration the digital cross-correlation step may comprise: a) initializing the content of an accumulation register capable of storing N/M data; b) taking a first group of N/M samples of the received signal starting from the starting point of the corresponding block increased by the time shift of the first pulse; c) multiplying the first group by the polarity of the first pulse; d) adding the resulting group of N/M samples to the content of the accumulation register; and repeating sub-steps b) to d) for all the L pulses. However, when the signal-to-noise ratio is not sufficiently high, each slice can be computed using several adjacent synchronization slots belonging to several consecutive super frames.

Regardless of the case, the method according to the invention preferably comprises after each correlation iteration, a step of comparing the content of the accumulation register with a first predetermined threshold. The stop criterion may comprise the detection of at least one sample, called a peak, of the accumulation register having a value greater than the first predetermined threshold, or a predetermined maximum number of correlation iterations. The number of peaks that can be detected depends on the number of relevant paths (with large enough amplitude) of the channel.

According to an embodiment of the invention, the detection may comprise a first sub-step of detecting one replica of the training sequence. The first sub-step may comprise storing in memory the position of each peak in the accumulation register as well as its sign. Once a peak is detected, its position with respect to the correlation window is used to adjust the timing reference to the beginning of the next training sequence replica.

However, the first sub-step can successfully detect any of the replicas of the training sequence, while the object of the synchronization is to provide a receiver with the end point of the preamble, namely the index that identifies the last sample of the last replica of the training sequence. Thus, according to an embodiment of the invention, the preamble contains an additional flipped last replica of the training sequence and the detection step comprises a second sub-step, also called an alignment, including sequentially scanning the next replicas until the flipped last one is found.

According to an embodiment of the invention, scanning a next replica may comprise performing a correlation between the next replica and the training sequence, comparing the correlation result with a second predetermined threshold, and if the absolute value of the correlation result exceeds the second threshold, using the sign of the correlation result and the sign of each detected peak to decide whether the next replica is the last one or if the scanning operation is to be performed again with the replica following the next replica.

Another aspect of the invention is directed to an independent data device for a wireless data communications system, for example of the WPAN type, and more particularly, of the piconet type. The independent data device may comprise reception means for receiving an incident pulsed signal of the ultra wide band type from a channel. The incident signal contains a preamble including a training sequence having a series of pulses whose polarity and time shifts are defined by respective polarity code and time-hopping code.

The independent data device may also comprise synchronization means comprising digital cross-correlation and detection means. The digital cross-correlation means may perform a cross-correlation of the received signal with the training sequence. The cross-correlation may include algebraically summing in accordance with the polarity code, windows of the received signal. The starting points of the windows are determined by the time-hopping code. The detection means may detect the end point of the preamble from the result delivered by the cross-correlation means.

The training sequence may comprise replicas, each of which having a size of N samples and containing L pulses, each window having a size of N samples, and the digital cross-correlation means is adapted to perform the cross-correlation iteratively in a block-by-block fashion until a stop criterion is reached. The starting points of two consecutive blocks of correlation may be separated by 2N samples.

The cross-correlation means comprises an accumulation register capable of storing N data, and processing means. The processing means is adapted, for each iteration, to a) initialize the content of the accumulation register; b) take a first group of N samples of the received signal starting from the starting point of the corresponding block increased by the time shift of the first pulse; c) multiply the first group by the polarity of the first pulse; d) add the resulting group of N samples to the content of the accumulation register; and repeat sub-steps b) to d) for all the L pulses.

The training sequence may comprise at least M+1 replicas, each replica having a size of N samples and containing L pulses, with M being a sub-multiple of N greater than or equal to 2. The digital cross-correlation means is adapted to perform the cross-correlation step iteratively in a block-by-block fashion until a stop criterion is reached. The computation of each block is split into M slices which are computed by algebraically summing windows N/M samples long.

The incident signal carries information within a super frame or a frame structure. Each super frame or frame containing the preamble includes at least M+1 synchronization slots corresponding respectively to the replicas of the training sequence. The cross-correlation means is adapted to compute each slice using one synchronization slot.

The digital cross-correlation means may be adapted to perform the cross-correlation step iteratively in a block-by-block fashion until a stop criterion is reached. The starting points of two consecutive blocks of correlation may be separated by N+N/M samples. The cross-correlation means may comprise an accumulation register capable of storing N/M data, and processing means. The processing means may be adapted for each iteration, to: a) initialize the content of the accumulation register; b) take a first group of N/M samples of the received signal starting from the starting point of the corresponding block increased by the time shift of the first pulse; c) multiply the first group by the polarity of the first pulse; d) add the resulting group of N/M samples to the content of the accumulation register; and repeat sub-steps b) to d) for all the L pulses.

The incident signal carries information within a super frame or a frame structure. Each super frame or frame containing the preamble includes at least M+1 synchronization slots corresponding respectively to the replicas of the training sequence. The cross-correlation means is adapted to compute each slice using several adjacent synchronization slots belonging to several consecutive super frames.

The cross-correlation means may comprise comparison means for comparing after each correlation iteration, the content of the accumulation register with a first predetermined threshold. The stop criterion may comprise the detection of at least one sample, called a peak, of the accumulation register having a value greater than the first predetermined threshold, or a predetermined maximum number of correlation iterations.

The detection means may comprise memory means and storing means for storing in the memory means the position of each peak in the accumulation register as well as its sign. The preamble may contain an additional flipped last replica of the training sequence, and the detection means may comprise scanning means for sequentially scanning the next replicas until the flipped last one is found.

The scanning means may comprise correlation means, comparison means and control means. The correlation means performs a correlation between the next replica and the training sequence. The comparison means compares the correlation result with a second predetermined threshold. For the control means, if the absolute value of the correlation result exceeds the second threshold, the sign of the correlation result and the sign of each detected peak are used to decide whether the next replica is the last one, or if the scanning operation must be performed again with the replica following the next replica.

BRIEF DESCRIPTION OF THE DRAWINGS

Other advantages and features of the invention will appear on examining the detailed description of embodiments, these being in no way limiting and of the appended drawings in which.

DETAILED DESCRIPTION OF THE PREFERRED EMBODIMENTS

Figure 1:
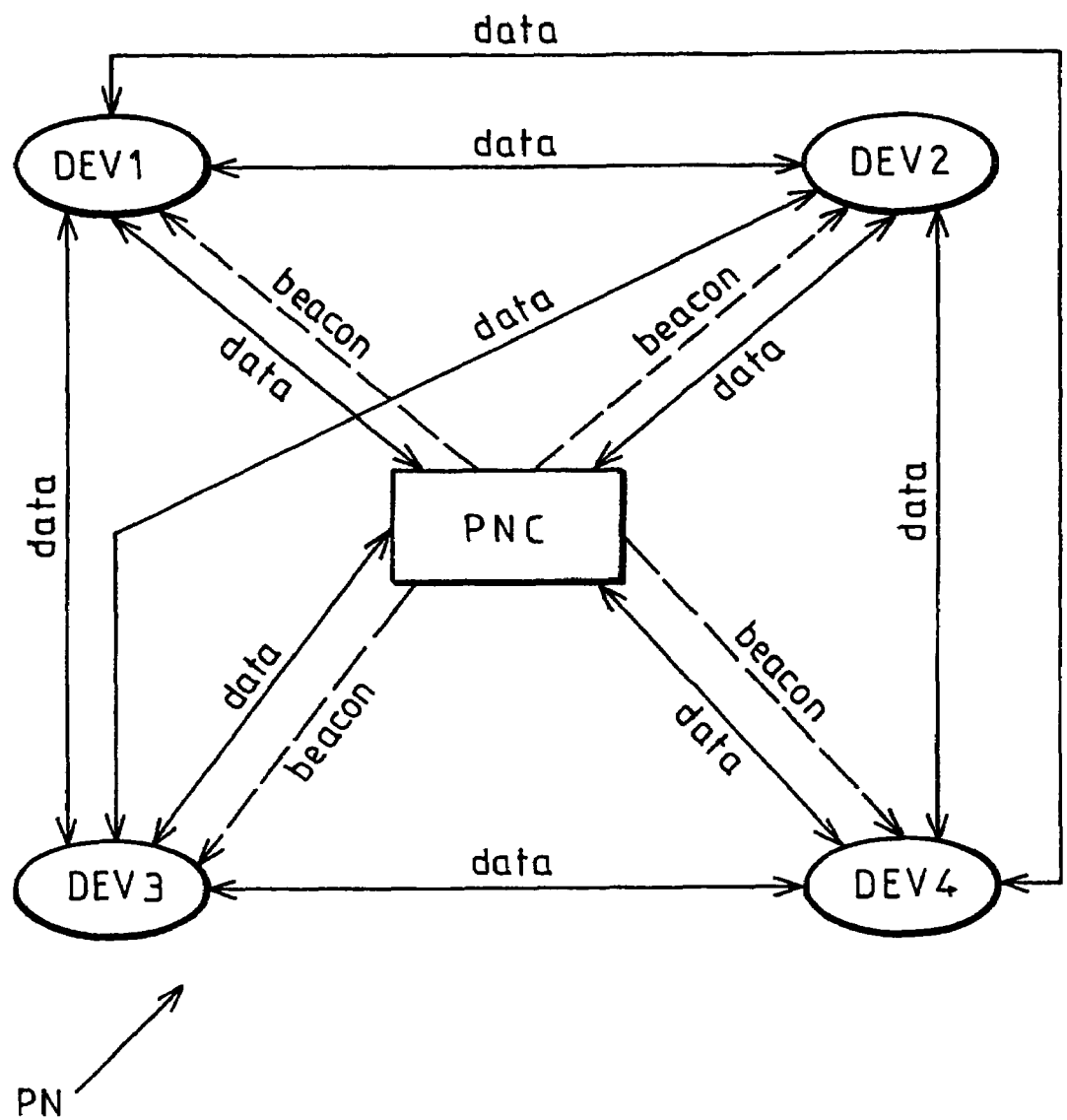
FIG. 1 shows diagrammatically an architecture of a wireless personal area network according to the invention.

FIG. 1 shows a wireless communication system, such as a wireless personal area network. This wireless communication system network can be organized, for example, in a piconet PN fashion, which allows a number of independent data devices DEVi to communicate with each other. A WPAN can be composed of several piconets.

A piconet is distinguished from other types of data networks in that communications are normally confined to a person or object that typically covers about 10 meters in all directions, and envelops the person or object whether stationary or in motion. A piconet is in contrast to local area networks (LAN), metropolitan area networks (MAN), and wide area networks (WAN) that cover a large geographic area, such as a single building or a campus or that would interconnect facilities in different parts of a country or the world.

The basic component of a piconet is a independent data device DEV. Such an independent data device may be, for example, a personal computer or the like. One independent data device DEV is required to assume the role of the piconet coordinator PNC. The piconet coordinator PNC provides the basic timing for the piconet with a beacon that is a part of a super frame, as will be explained in greater detail below. The PNC can communicate with the independent data devices DEVi. Further, two independent data devices can communicate with each other directly, in a peer-to-peer manner, without relaying through the PNC.

Figure 2:
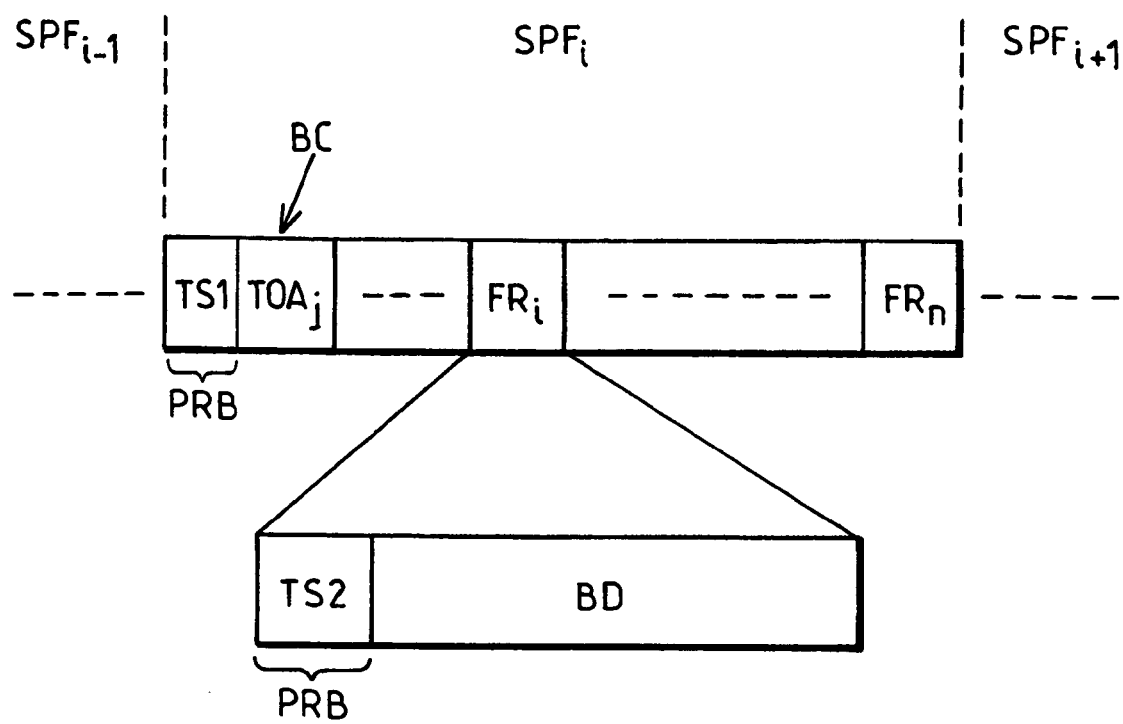
FIG. 2 shows diagrammatically an example of a super frame structure according to the invention.

FIG. 2 depicts a super frame structure used in the present invention for the communication between the coordinator PNC and the data devices DEV, as well as for the communication between two independent data devices.

The incident signal received from a channel by an independent data device DEV carries information within a super frame structure. Each super frame $SPF_i$ includes several frames FRi respectively allocated to communications between specific pairs of independent data devices DEV.

Further, each super frame includes a head part, also called a beacon BC. The beacon contains a preamble PRB including a periodic training sequence TS1 and a body including time of arrival indication $TOA_j$ for each frame $FR_j$. Further, each frame $FR_i$ includes also a preamble PRB containing a training sequence TS2 and a body portion BD containing the useful data.

Figure 3:
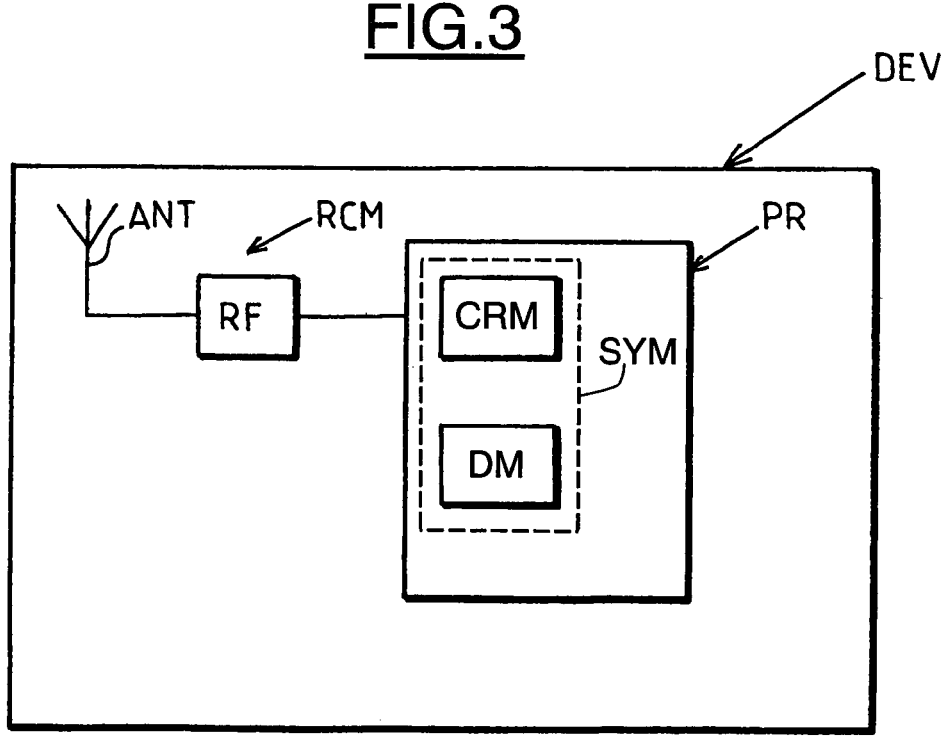
FIG. 3 shows diagrammatically an internal architecture of an independent data device according to the invention.

As illustrated in FIG. 3, an independent data device DEV basically comprises reception means RCM followed by a processor PR. More precisely, reception means comprises an antenna ANT followed by a conventional front end radio frequency stage. The processor comprises synchronization means SYM which includes digital cross-correlation means CRM and detection means DM. The internal architecture of the cross-correlation means CRM and the detection means DM will be described in greater detail below.

When an independent data device DEV is turned on, it will first search for an existing piconet in its neighborhood, and then synchronize to its coordinator PNC. This operation is named cell synchronization, or DEV-to-PNC synchronization.

The cell synchronization operation can be subdivided in three distinct phases: the coarse synchronization, the fine synchronization, and the clock synchronization. During the coarse synchronization, the independent data device DEV is looking for the training sequence TS1 sent by the coordinator PNC. The object of the digital coarse synchronization is to provide the independent data device with an index of the sample corresponding to the end of the beacon preamble.

During the fine synchronization, the independent data device synchronizes precisely to the beginning of the beacon body which contains, for example, the different indications $TOA_j$ to be sent by the coordinator to all independent data devices DEV of the piconet. The clock synchronization includes identifying an eventual drift between the coordinator's clock and the independent data device clock.

The different ways of implementing a coarse synchronization will now be described in greater detail. Generally speaking, during a first phase including a digital cross-correlation step, one of the replicas of the periodic training sequence TS1 will be detected. Then, during a second phase, the end of the beacon preamble will be actually detected.

In the beacon preamble a known training sequence TS1, also referred to as s(t), is transmitted by the piconet coordinator (PNC). To perform the synchronization with the PNC, a device has to detect this signal in the presence of noise and interference, and from this have a timing reference for synchronization. The training signal s(t) has the form of a pulsed UWB signal in Equation (1):

$$s(t) = \sum_{j=0}^{L-1} a_j p(t - jT_f - c_j T_c) \qquad (1)$$

Indeed, s(t) is a series of L pulses p(t), nominally spaced by $T_f$ (pulse repetition period: PRP) and whose polarity and time shifts (time-hopping) are defined by the sequences (or codes) $a_j$ and $c_j$, respectively. $T_c$ represents the granularity of the time shift (i.e., the minimum separation between two pulse positions inside a PRP). In another context, for a 2-PPM data modulation, Tc is the time duration between an early pulse and a late pulse, as mentioned above with reference to a nominal position. It is useful to represent s(t) as:

$$s(t) = p(t) * \sum_{j=0}^{L-1} a_j \delta(t - jT_f - c_j T_c) = p(t) * b(t) \qquad (2)$$

where * denotes the linear convolution operator and b(t) includes the contributes of the codes $a_j$ and $c_j$.

It is assumed that the received signal r(t) corresponds to s(t) delayed by a certain time τ plus a zero mean gaussian noise process n(t) with power equal to $\sigma^2$. It is known that the detection of the training sequence is based on the cross-correlation of r(t) with the signal s(t) and can be implemented for instance, with an analog matched filter.

The final goal of synchronization is to have an estimate $\hat{\tau}$ of the delay τ. However, in digital UWB radio technology, the synchronization means has access only to samples of the received signal. The correlation or matched filter has thus to be implemented digitally by using samples whose sampling frequency is determined by the system.

The signals are redefined as follows:

$$s_n = \sum_{j=0}^{L-1} a_j p_{n-c_j} = p_n * \sum_{j=0}^{L-1} a_j \delta_{n-c_j} = p_n * b_n \qquad (3)$$

$$r_n = s_n + n_n \qquad (4)$$

where $p_n$ is the sampled version of p(t). The sequences $a_j$ and $c_j$ are the polarity and time-hopping patterns used in the training sequence. The training sequence comprises replicas, each of which having a size of N samples and containing L pulses. In other words, the training sequence is periodic with a period of N samples.

The output signal $x_n$ is the sum of a signal term $y_n$ and a noise term $q_n$:

$$x_n = r_n * c_{-n} = \sum_{j=0}^{L-1} a_j r_{n+d_j} = y_n + q_n \qquad (5)$$

The signal term $y_n$ is the following:

$$y_n = s_{n-m} * c_{-n} = p_n * c_n * \delta_{n-m} * c_{-n} = p_n * R_{cc}(n) * \delta_{n-m} \qquad (6)$$

where $R_{cc}(n)$ is the autocorrelation function of $c_n$ and $\delta_n$ is the Dirac delta function.

Figure 4:
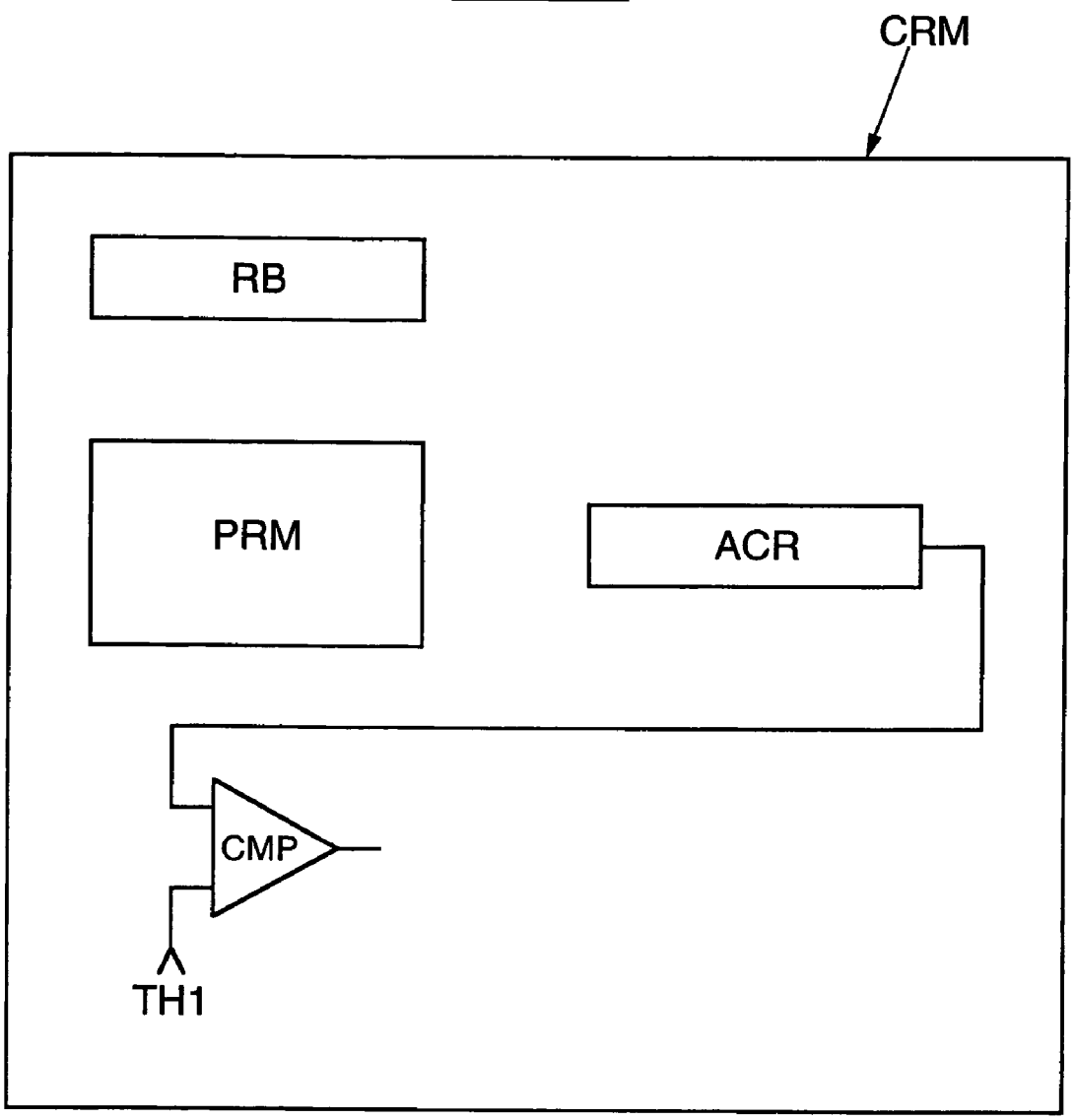
FIGS. 4 and 5 show diagrammatically in greater detail, portions of the independent data device illustrated in FIG. 3.

As illustrated in FIG. 4, the cross-correlation means CRM comprise a receiving buffer RB. Theoretically, to correctly perform the block-by-block circular correlation, the processor PR has to be extremely fast because the result must be achieved and the receiving buffer RB emptied before the arrival of the next block of the received signal. The invention provides an implementation that avoids such a disadvantage, and the invention uses the periodicity properties of the signal, i.e., the training sequence.

In this case, the matched filtering can be performed in a circular way and the periodic autocorrelation function of $b_n$, $\tilde{R}_{bb}(n)$ appears in the expression of $y_n$. $\tilde{R}_{bb}(n)$ is periodic with a period of N samples and so the correlation process can be performed in a block-by-block fashion, iteratively filtering blocks of N samples of the received signal.

Figure 6:
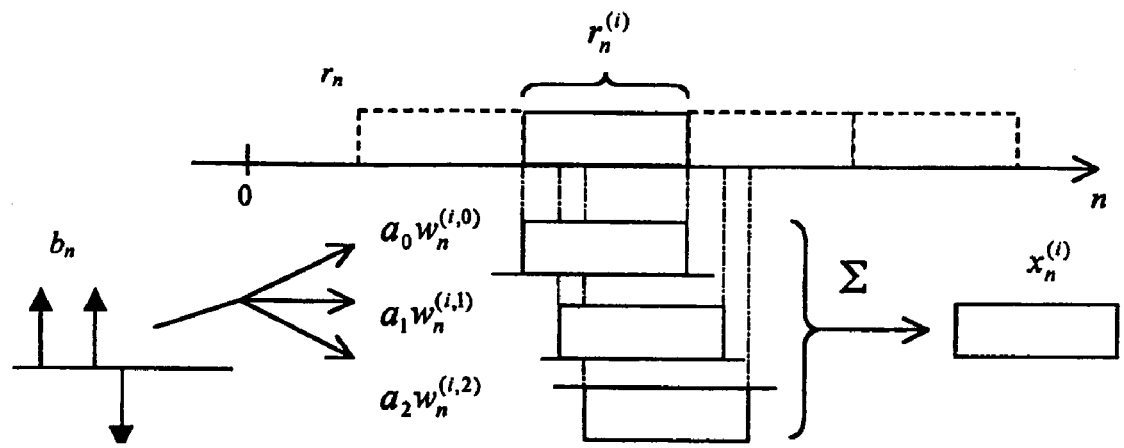
FIGS. 6-8 relate to a first embodiment of a method according to the invention.

In other words, the received signal $r_n$ is split into blocks of N samples. At each iteration of the synchronization algorithm one block is received as input, a circular correlation with $b_n$ is computed and the result is passed to a threshold device. More precisely, for the periodicity properties of the signal, a block circularly shifted of $c_j$ samples has the same signal content of a block taken from the received signal, but starting $c_j$ samples after. In this way the circular correlation can be computed by using different windows $w_n^{(i,j)}$ of the received signal, whose starting points are selected according to the time-shifts $c_j$, as depicted in FIG. 6.

The $i^{th}$ output block $x_n^{(i)}$, n=0,1, . . . N−1 is obtained as follows:

$$x_n^{(i)} = \sum_{j=0}^{L-1} a_j r_{n+2Ni+c_j} = \sum_{j=0}^{L-1} a_j w_n^{(i,j)}, \; i = 0, 1, \ldots \qquad (7)$$

Figure 7:
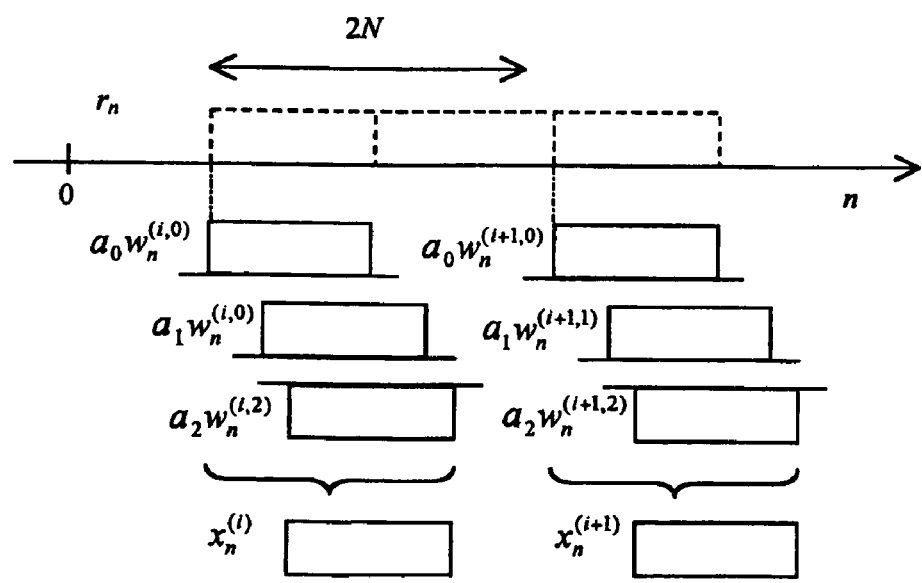

The term $2Ni+c_j$ corresponds to the starting times of the windows $W_n^{(i,j)}$ of the received signal. The starting points of consecutive blocks of correlation are separated by 2N samples, as depicted in FIG. 7. The sliding correlation algorithm according to this embodiment requires very low complexity for digital data processing. As polarity signaling is used, the weights $a_j$ are +/−1, and therefore, the whole synchronization algorithm turns out to be the sum (or difference) of windows of the received signal, whose starting points are determined by the time-hopping code used in the training sequence.

Figure 8:
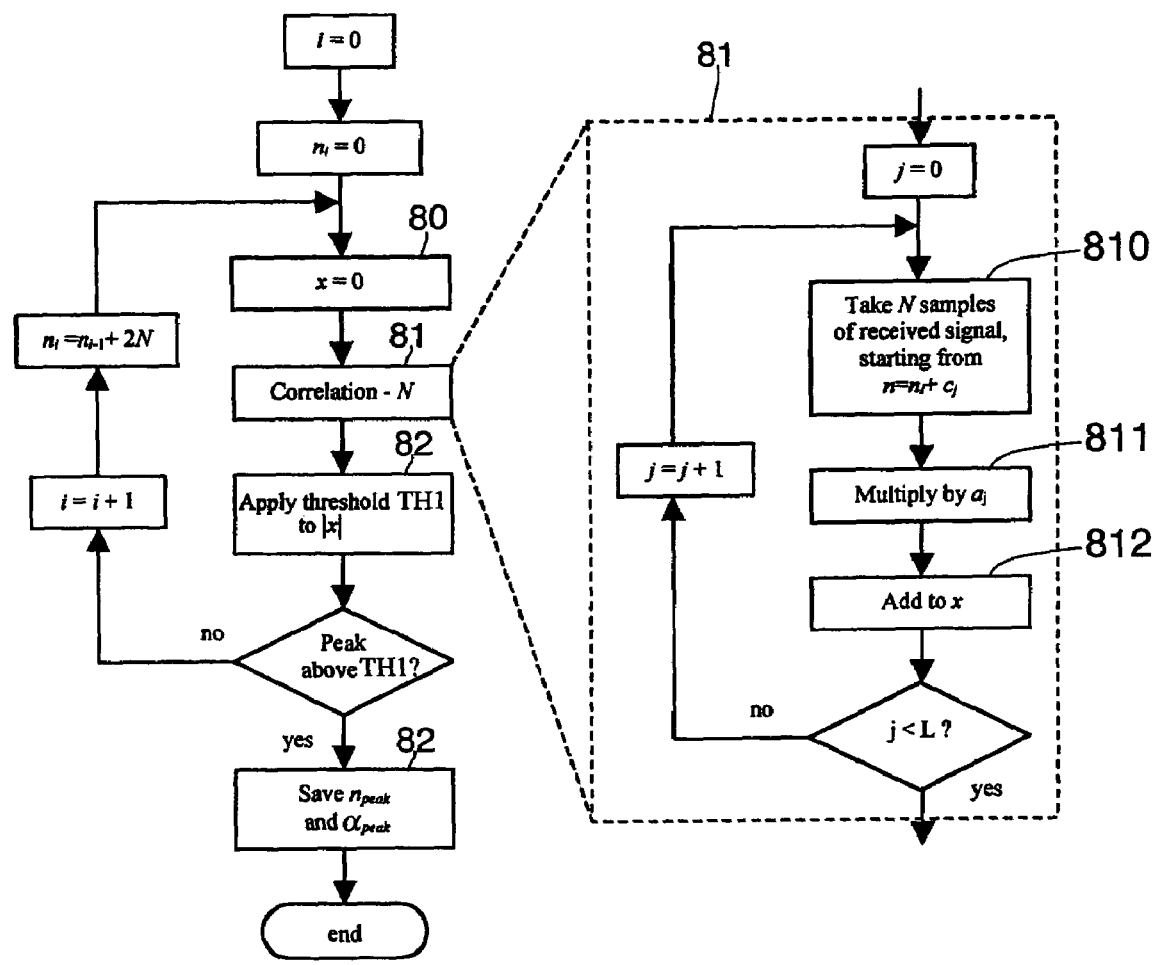

The flow chart of the sliding correlation according to this embodiment is also illustrated in FIG. 8. In this figure, it is assumed that $n_i$=0 identifies the first available sample in the FIFO reception buffer RB (FIG. 4). Each iteration i of the digital cross-correlation phase is performed by processing means PRM (FIG. 4). Further, the cross-correlation means CRM comprises an accumulation register ACR for storing the value x.

The cross-correlation CRM further comprises comparison means CMP for comparing the absolute value of x with a first predetermined threshold TH1. As illustrated in FIG. 8, after the content of the accumulation register has been initialized to 0 (step 80) the $i^{th}$ correlation iteration 81 is performed.

More precisely, this iteration comprises (step 810) taking N samples of the received signal starting from the starting point of the corresponding block increased by the time shift $c_j$ of the first pulse.

Then, the first group is multiplied by the polarity $a_j$ of the first pulse (step 811). The resulting group of N samples is added (step 812) to the content of said accumulation register, and these sub-steps are repeated for all the L pulses.

The object of the synchronization algorithm is to provide the receiver with the index $n_{synchro}$ of the sample corresponding to the end of the beacon preamble. A part of this information is obtained by the correlation means, and more precisely, by the position and the sign of a peak detected after comparison with the threshold TH1 (step 82).

Figure 5:
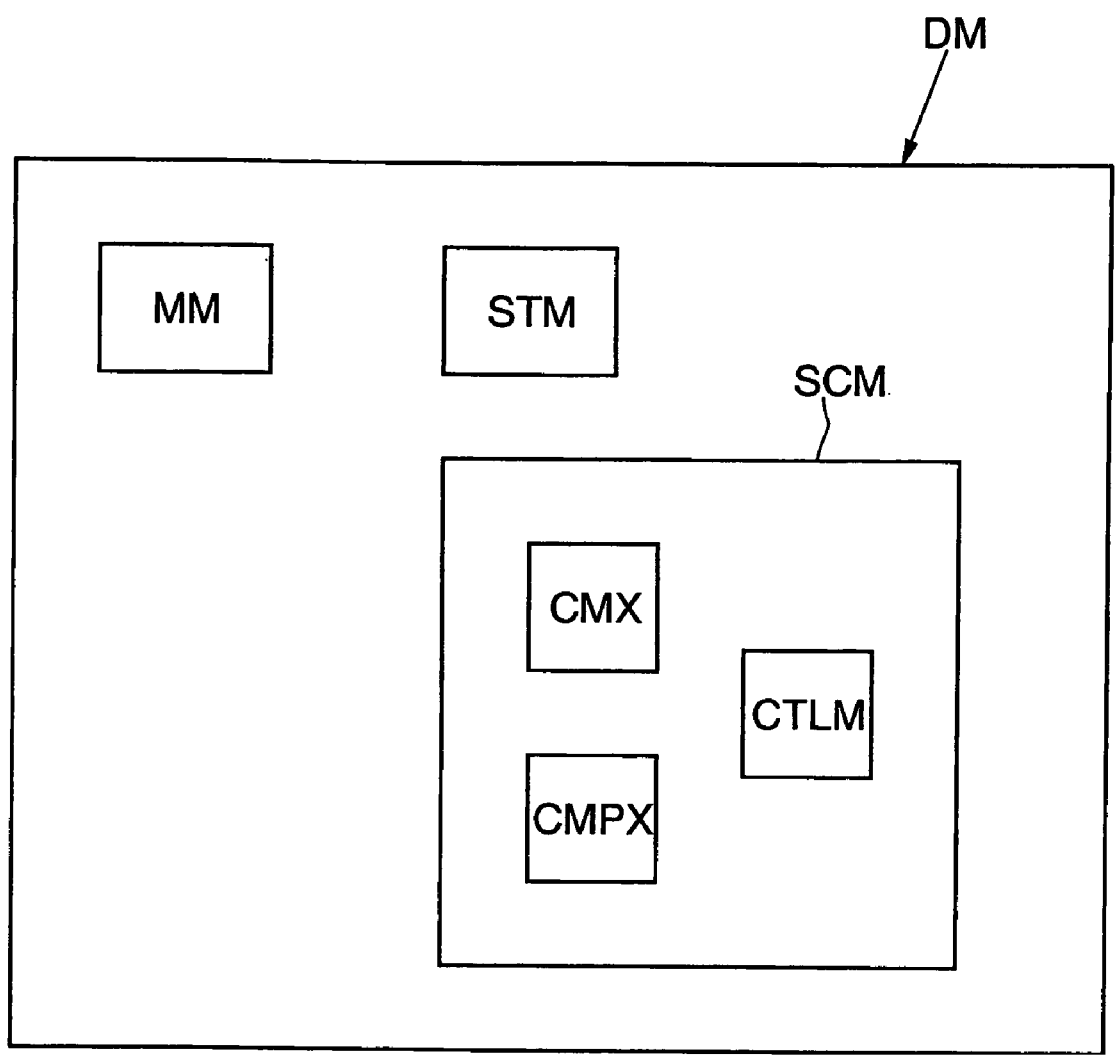

More precisely, if a peak is successfully detected (the absolute value of a sample of the correlation output is above the threshold), its position $n_{peak}$ and its sign $\alpha_{peak}$ are stored (step 83) by storing means STM into memory means MM (FIG. 5). The sign of the peak holds information on the absolute phase of the received signal and is also needed to obtain $n_{synchro}$. In fact, $n_{peak}$ is not sufficient to determine $n_{synchro}$. The training sequence has been assumed to be periodic with period N, and hence $n_{synchro}$ provides information with an ambiguity modulo N. It will be explained in greater detail below on how to solve this ambiguity modulo N.

In FIG. 8, it has been assumed that the stop criterion of the outer loop was the detection of a peak. However, in some cases, the signal-to-noise ratio can be so low that no detection is possible. Another possibility is that no coordinator is transmitting, and consequently there is nothing to detect. Therefore, it is preferable that the stop criterion comprises also a condition on a maximum number of iterations.

Further, a single peak is likely to exceed the threshold TH1 only if a single path channel is assumed. In the case of a multipath channel, many peaks may exceed the threshold TH1. Here (FIG. 9) and in the following, it is assumed that a single path channel is present.

The optimization of the algorithm according to the invention with multipath propagation will be treated in greater detail below. The main advantage of the embodiment which has been described is a very low complexity of the control needed for the processing of data. Nevertheless, the requirements of the size of the receiving buffer could still be too large for very low cost receivers.

More precisely, with the sliding correlation algorithm described above, the $i^{th}$ iteration (or block) of the full correlation is obtained as:

$$x_n^{(i)} = \sum_{j=0}^{L-1} a_j w_n^{(i,j)}, n = 0, 1, \ldots N-1 \qquad (8)$$

Namely, the block is the result of the sum of L weighted windows $w_n^{(i,j)}$ of the received signal. The size of such windows is the factor that constrains the minimum buffer size in the reception, which must be able to store N samples. As a numerical example, if the training sequence is 1 μs long, a sampling frequency equal to 20 GHz implies that the buffer in reception must be able to store N=20000 samples.

However, according to one possible implementation suitable for very low cost receivers, only N=1280 samples can be stored in the buffer, corresponding to a training sequence with duration 64 ns sampled at 20 GHz. Thus, it is particularly advantageous to reduce the complexity required by the sliding correlation algorithm detailed above.

The invention proposes accordingly in the embodiment which will be now described, a slice splitting correlation algorithm. With respect to how the sliding correlation is performed, it is clear that the $n^{th}$ sample of the output block is the result of the sum of the $n^{th}$ samples in the windows of the received signal that are summed to get the output block.

Indeed, nothing prevents the algorithm from just computing part of the whole block, for instance the first half. The first N/2 samples of the output block are obtained by just considering the first halves of the windows used previously, and the same happens for the second half of the block. In other words, the computation of the $i^{th}$ block can be split into two slices, which can be computed by adding weighted windows N/2 samples long. The following relationship holds between a block and the corresponding slices:

$$x_n^{(i,k)} = x_{n+k\frac{N}{2}}^{(i)}, n = 0, 1, \ldots N/2 - 1, k = 0, 1 \qquad (9)$$

where $x_n^{(i,k)}$ denotes the $k^{th}$ slice of the $i^{th}$ block. From the received signal $r_n$, the slice $x_n^{(i,k)}$ can be obtained by combining Equation (8) with Equation (9):

$$x_n^{(i,k)} = \sum_{j=0}^{L-1} a_j r_{n+3iN+kN+k\frac{N}{2}+c_j} = \sum_{j=0}^{L-1} a_j w_n^{(i,k,j)}, \qquad (10)$$

$$n = 0, 1, \ldots N/2 - 1, k = 0, 1$$

Figure 9:
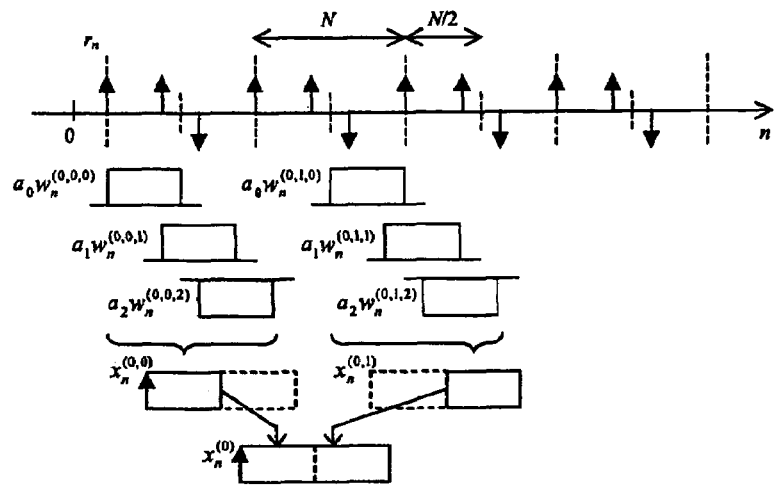
FIGS. 9-11 relate to a second embodiment of a method according to the invention.

FIG. 9 describes the relationship between the block $x_n^{(i)}$ and the slices $x_n^{(i,k)}$ and how these are obtained from the received signal.

The delay term $3iN+kN+kN/2+c_j$ in Equation (10) describes the starting points of the windows to be summed and deserves a more detailed explanation. With the help of FIG. 9, the meanings of all the contributions are clear. $c_j$ is the time-shift given by the time-hopping code. kN/2 is needed to properly align the slices inside the block. kN is needed to prevent windows of the same block but of different slices from overlapping. 3iN is needed to prevent windows of different blocks from overlapping.

The slice splitting procedure can be generalized with more than 2 slices. Generally speaking, a block of N samples can be split into M slices of N/M samples, where M is a sub-multiple of N. The slices are defined as follows:

$$x_n^{(i,k)} = x_{n+k\frac{N}{M}}^{(i)}, n = 0, 1, \ldots N/M - 1, k = 0, 1, \ldots M - 1 \qquad (11)$$

And Equation (8) can be modified accordingly:

$$x_n^{(i,k)} = \sum_{j=0}^{L-1} a_j r_{n+[i(M+1)+k]N+k\frac{N}{M}+c_j} = \sum_{j=0}^{L-1} a_j w_n^{(i,k,j)} \qquad (12)$$

As before, the delay term $i(M+1)N+kN+kN/M+c_j$ in Equation (12) describes the starting points of the windows $w_n^{(i,k,j)}$ to be summed: $c_j$ is the time-shift given by the time-hopping code; kN/M is needed to properly align the slices inside the block; kN is needed to prevent windows of the same block but of different slices from overlapping; and $i(M+1)N$ is needed to prevent windows of different blocks from overlapping.

At this stage, a change of notation is useful: an index m is defined, which combines the index i (block of full correlation) and the index k (slice of the correlation):

$$m=(i-1)\cdot M+k, \quad i=0,1,\ldots, \quad k=0,1,\ldots M-1 \quad (13)$$

And conversely $$i=\lfloor m/M \rfloor$$

$$k=m \bmod M \quad (14)$$

where $\lfloor \cdot \rfloor$ denotes the floor operation.

As it is well known by those skilled in the art, the floor function applied to x gives the largest integer less than or equal to x. With this notation, the starting point of the windows is shifted exactly N+N/M samples at every increment of m.

$$x_n^{(m)} = \sum_{j=0}^{L-1} a_j r_{n+m(N+\frac{N}{M})+c_j} = \sum_{j=0}^{L-1} a_j r_{n+n_m+c_j} = \sum_{j=0}^{L-1} a_j w_n^{(m,j)} \quad (15)$$

$w_n^{(m,j)}$ is a window of N/M samples, starting at sample $n_m$ of $r_n$.

It can be verified that an iteration of the full correlation (m=0,1, ... M−1) does not require more than M+1 repetitions of the training sequence in the beacon preamble. While FIG. 8 illustrates the flow chart of the sliding correlation according to the invention, FIG. 10 illustrates the flow chart of the slice splitting correlation according to the invention.

Figure 10:
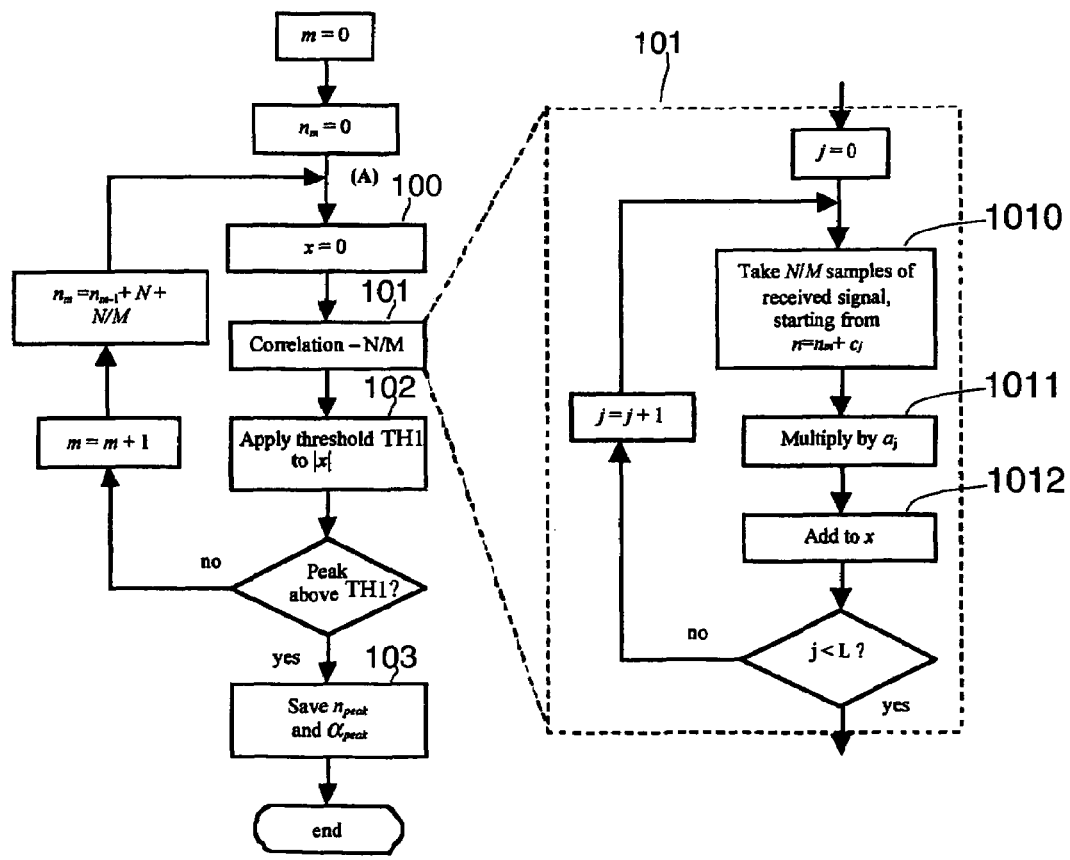

Except for the number of samples in windows, the steps illustrated in FIG. 10 are analogous to those illustrated in FIG. 8, and will not be described in detail here. More precisely, in FIG. 10, steps 100, 101, 102 1010, 1011 and 1012 are analogous to the corresponding steps 80, 81, 82, 810, 811 and 812 of FIG. 8.

The slice splitting algorithm permits trade off between the complexity of the receiver (in particular, the size of the buffer needed in reception) against the duration of the beacon preamble. In fact the overall duration of the beacon preamble, N(M+1) samples depends linearly on the number of slices M while the length of the buffer N/M samples is inversely proportional to M.

Figure 11:
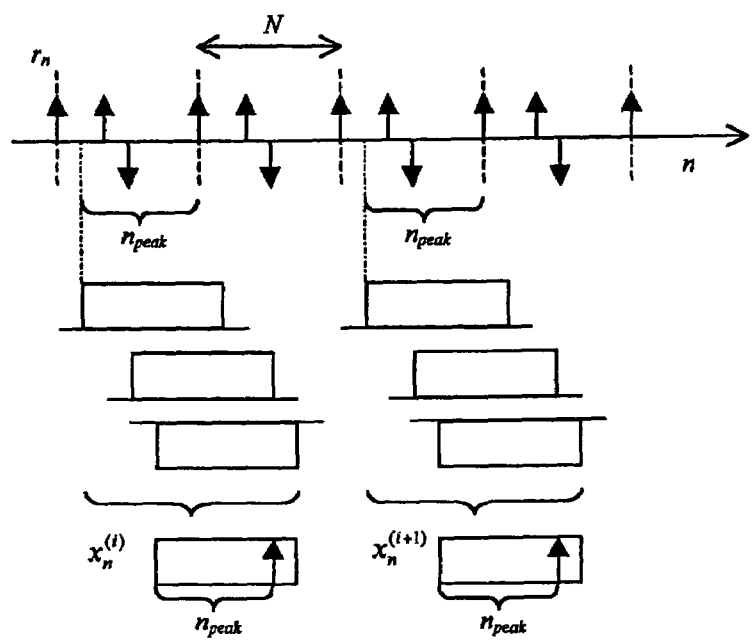

As indicated above, either for the sliding correlation of the first embodiment, or the slice splitting correlation of the second embodiment, $n_{peak}$ is affected by an ambiguity modulo N samples, deriving from the fact that the correlation can successfully detect any of the replicas of the training sequence. As an example, FIG. 11 illustrates a case in which a training sequence is replicated 4 times. Two possible positions to start the synchronization algorithm are displayed, and both of them corresponds exactly the same correlation output.

It must still be determined which one has been detected, in order to provide the value of $n_{synchro}$. However, because any of the replicas of the training sequence are identical, there is no way to determine if the first, the second or the last replica has been detected by the cross-correlation step. Although the detection step which will be now described is independent of the type of correlation used, either sliding or slice-splitting correlation, it is assumed now that the cross-correlation means are adapted to perform a slice-splitting correlation.

Figure 12:
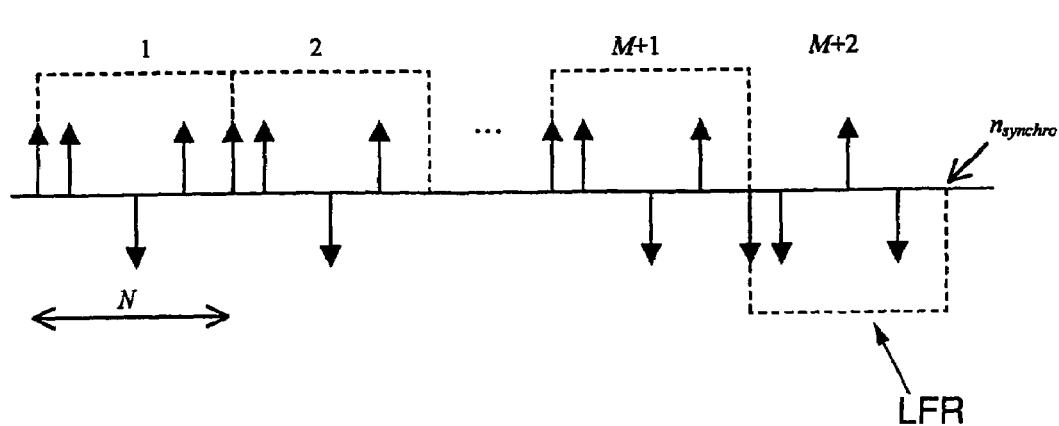
FIGS. 12 and 13 relate more particularly to an alignment step of the method according to the invention.

To overcome the problem of ambiguity modulo N samples, an additional replica of the training sequence is inserted just after the M+1 replicas, but flipped. This differentiates it from the other replicas. FIG. 12 illustrates the procedure in which LFR designates the last flipped replica of the training sequence TS1. All in all, the number of replicas of the training sequence in the beacon preamble is Q=M+2.

As indicated above, the detection step according to the invention comprises in fact a first sub-step of detecting one replica of the training sequence, as well as a second sub-step alignment phase including sequentially scanning the next replicas until the flipped last one is found. In this respect, detection means DM (FIG. 5) comprises scanning means SCM. More precisely, the scanning means comprises correlation means CMX which are adapted, in this example, to perform also a slice-splitting correlation, and comparison means CMPX as well as control means CLTM.

Figure 13:
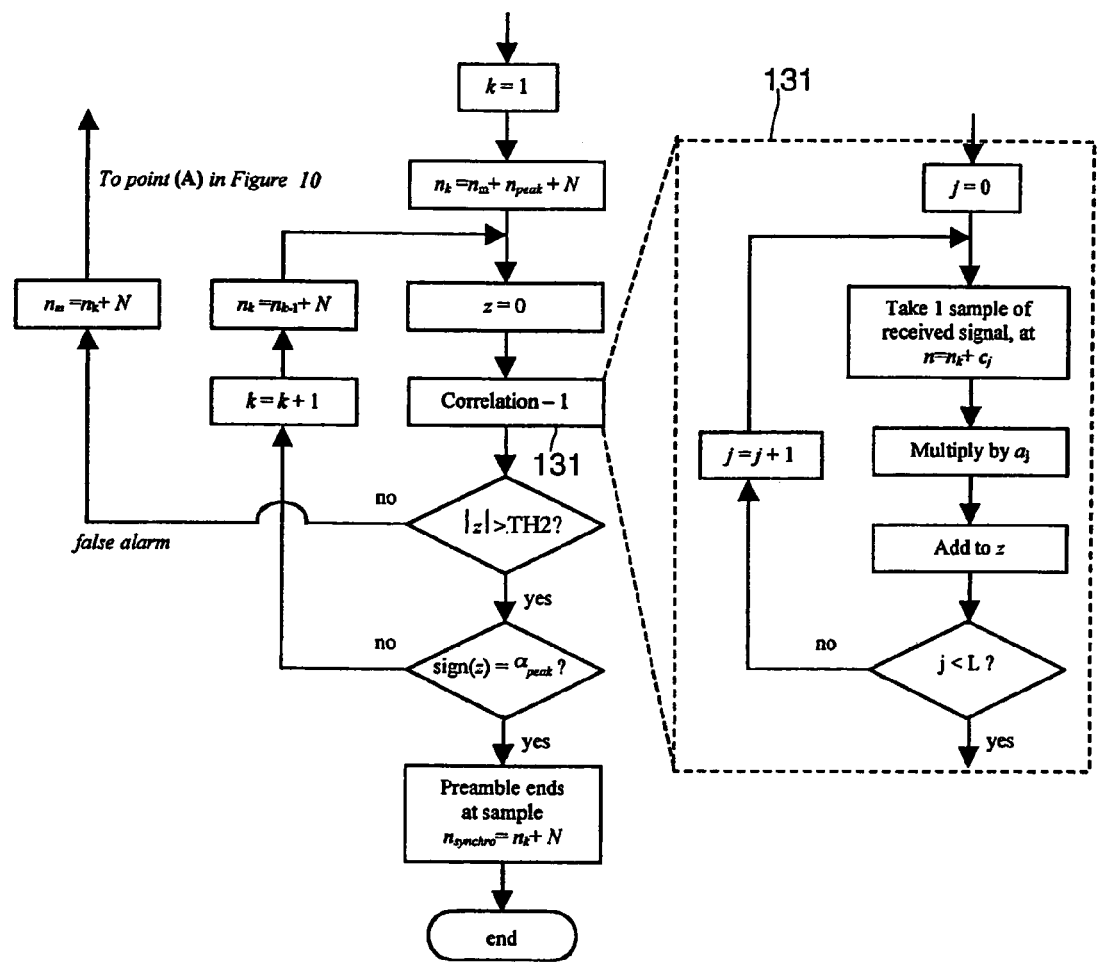

The flow chart of this alignment phase of the detection step, including also a slice-splitting correlation 131, is illustrated in FIG. 13. Let the detected replica be the $i^{th}$ out of Q. The receiver has no knowledge of which is the actual value of i (i=1,2, ..., Q). The only information in its possession is the position of the peak $n_{peak}$ and its sign $\alpha_{peak}$, relatively to the $i^{th}$ replica of the training sequence. For M=1 (no division of the correlation in slices), $n_{peak}$ can assume values from 0 up to N while if M>1, $n_{peak}$ can assume values from 0 to N/M. It can be verified that in both cases $n_{peak}$ corresponds to the number of samples that separate the reference point $n_m$ assumed in the correlation process and the beginning of the $(i+1)^{th}$ replica of training sequence. In this way the receiver is able to align with the beginning of the $(i+1)^{th}$ replica, $(i+2)^{th}$, $(i+k)^{th}$ replica and so on, as all the replicas are N samples long.

The receiver can now evaluate the correlation between the $(i+1)^{th}$ replica and the training sequence. In this step it is not necessary to compute a large portion of the full correlation (over a window of N or N/M samples), as the position of the peak is known from the previous cross-correlation step. Therefore, only a zero-shift correlation is evaluated, by simply adding the samples in the positions prescribed by the pseudo-random code.

$$z^{(k)} = \sum_{j=0}^{L-1} a_j r_{n_m+n_{peak}+c_j+kN}, \quad k=1,2,\ldots \quad (16)$$

The result z of the process for k=1 is then checked against a threshold TH2. If the absolute value of z is below the threshold TH2, a false alarm in the first step of the algorithm is assumed to have taken place and the cross-correlation step starts over. If the absolute value of z exceeds the threshold TH2, two cases are possible: if the sign of z is equal to $\alpha_{peak}$, the receiver aligns with the $(i+2)^{th}$ replica of the training sequence and applies again the alignment step of the algorithm. On the other hand, if the sign of z is different than $\alpha_{peak}$, the receiver becomes aware of being aligned with the $Q^{th}$ and last replica of the training sequence inside the beacon preamble and is then able to synchronize with the end of it.

After the cross-correlation step of the algorithm there is a fair certainty that the detected peak was not due to a false alarm. Moreover the alignment step of the algorithm is to be performed only a limited number of times, and thus false alarms are not likely to happen. Hence, in the alignment step of the algorithm a lower threshold TH2 can be used. This new decision affects only slightly the overall probability of missed detection and false alarm, in a way that is easy to compute. Empirically the threshold TH2 to be used in the alignment step could be such that the probability of false alarm in the decision is on the order of $10^{-4}$, namely on the same order of magnitude of the probability of false alarm in the cross-correlation step of the algorithm evaluated over a super frame duration.

As it has been determined, during the slice splitting correlation steps, when a peak exceeds the threshold, it is not likely to be the only one. If multipath propagation is assumed, after the correlation many paths could be detected, each corresponding to a $(n_{peak}, \alpha_{peak})$ pair. This is valuable information that can be exploited to increase the performance of the alignment step of the algorithm. In fact, instead of considering only a position for the alignment procedure, the detected paths can be combined in a rake-like fashion. If the number of detected peaks is U, the alignment step of the algorithm computes the correlation value z in this way:

$$z^{(k)} = \frac{1}{U}\sum_{u=1}^{U} \alpha_{peak}^{(u)} \sum_{j=0}^{L-1} a_j r_{n_m + n_{peak}^{(u)} + c_j + kN}, \quad k = 1, 2, \ldots \quad (17)$$

The operation corresponds to a coherent correlation with a rough estimate of the channel impulse response, namely a distance metric calculation. It is to be noted that the detected paths are not combined according to their estimated amplitude, but are only multiplied by their sign. This is a suboptimal approach but has the advantage of a lower complexity, with only a slight loss of performance.

In the multipath case it is not possible to compare the correlation output with the sign of a single peak. In a more correct way the sign of z should be compared with the result of the same correlation operator in Equation (17) on the window of the received signal that originated the detection, namely with the sign of:

$$z^{(0)} = \frac{1}{U}\sum_{u=1}^{U} \alpha_{peak}^{(u)} \sum_{j=0}^{L-1} a_j r_{n_m + n_{peak}^{(u)} + c_j} \quad (18)$$

In other words, replicas of the training sequence (convolved with the multipath channel) are seen as a series of binary symbols (either standard or flipped). The object of the alignment is to demodulate these binary symbols and especially correctly find the last one, which is the only one with opposite polarity. The aggregated energy of different paths enables to use an even lower threshold in the alignment step.

Figure 14:
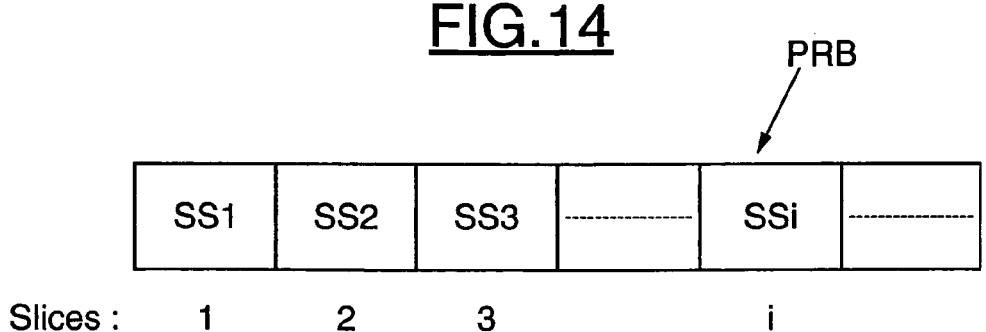
FIGS. 14 and 15 show diagrammatically two possible ways of computing signal slices in a slice-splitting correlation according to the invention.

As illustrated now in FIG. 14, the beacon preamble includes at least M+1 synchronization slots SSi corresponding respectively to the replicas of the training sequence. If the signal-to-noise ratio is high enough, each slice can be computed using one synchronization slot.

Figure 15:
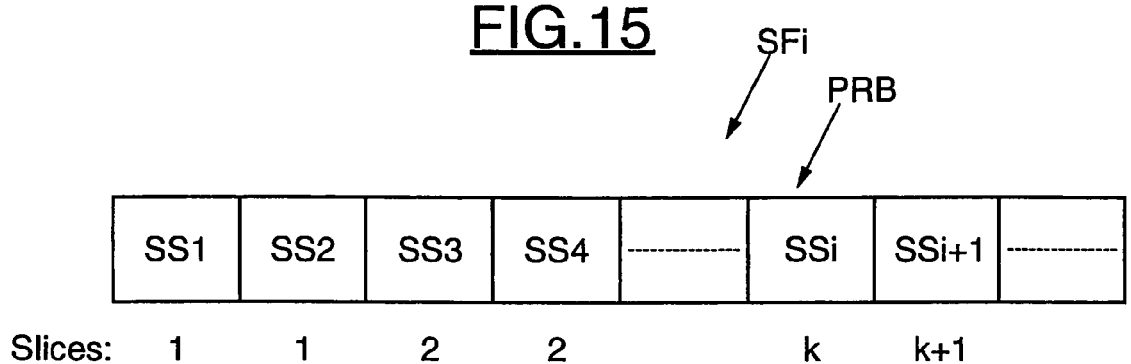
Figure 15:
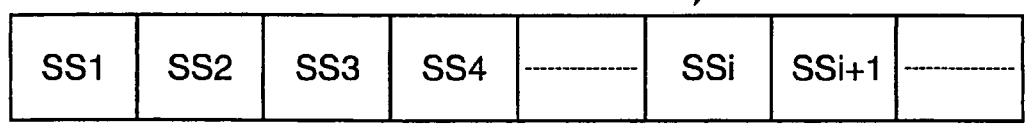

However, in case the actual operating signal to noise ratio is low, one synchronization slot SS may not be sufficient to gather enough energy for taking a decision with the desired degree of accuracy, and therefore, a longer period of time is required. Without changing the synchronization slot structure it is possible to achieve a better performance, by pairing adjacent synchronization slots SS, and using both of them to test a single slice (FIG. 15). The energy of the two synchronization slots SS is added, and only after the second synchronization slot SS a decision is taken. In this case, during a period of duration $MT_{train}$ (corresponding to M synchronization slots SS), it is possible to test only M/2 slices, e.g., the first half. Equation (15) is changed into:

$$x_n^{(m)} = \sum_{u=0}^{1} \sum_{j=0}^{L-1} a_j r_{n + m\left(2N + \frac{N}{M}\right) + uN + c_j} \quad (19)$$

The second half of the slices could be tested in the next M synchronization slots SS. Yet, if the second half of the slices is tested straight afterwards, there could be a missed detection, as during this period there could be a beacon preamble whose correct synchronization is located in the first M/2 slices. Therefore, after the round of M synchronization slots SS, it is necessary to test again the first M/2 slices. Only after a whole super frame period the last M/2 can be tested, throughout the next super frame duration. The worst-case synchronization time is then the duration of two super frames.

The invention is not limited to the above described embodiments. More precisely, although the sliding correlation or the slice splitting correlation have been described for performing a coarse synchronization between the coordinator PNC and an independent data device DEV, the correlations according to the invention can also be used for performing a frame synchronization between two independent data devices communicating with each other, using the training sequence TS2 contained in the preamble PRB of the frame $Fr_i$ (FIG. 2).

Further, the training sequence can be known by the device, or eventually unknown but belonging to a set of possible training sequences. In such a case, all the training sequences can be successfully tested using the synchronization method accordingly to the invention. The actual training sequence would be, for example, the one that leads effectively to a peak of detection. And the feature of flipped last replica can be extended to a pattern of flipped/unflipped training sequence replicas following, for instance, a Barker code.

Further, the above description is an example of application to a particular network structure with a particular super frame structure. However, the invention is not limited to this system. More generally, the slice splitting correlation of the invention can be used for performing a cross-correlation of a received signal on blocks of N samples when the size of the receiving buffer is smaller than N.

In other words, the invention proposes also a method for performing a digital cross-correlation of an incident signal containing a periodic training sequence, with the training sequence. The training sequence has M+1 replicas, each replica having a size of N samples and containing L pulses, with M being a sub-multiple of N greater than or equal to 2. The digital cross-correlation is performed iteratively in a block-by-block fashion. The computation of each block is split into M slices which are computed by algebraically summing windows N/M samples long.

What is claimed is:

1. A method for synchronizing a data device operating in a wireless data communications system using an incident pulsed signal of an ultra wide band type received over a channel by the data device, the incident pulsed signal comprising a preamble including a training sequence having a series of pulses whose polarity and time shifts are defined by respective polarity and time-hopping codes, the method comprising:

cross-correlating the incident pulsed signal with the training sequence, the cross-correlating comprising algebraically summing in accordance with the polarity code, windows of the incident pulsed signal, with starting points of the windows being determined by the time-hopping code; and detecting an end point of the preamble based upon a result of the cross-correlation.

2. A method according to claim 1, wherein the training sequence is periodic and comprises replicas, with each training sequence having a size of N samples and containing L pulses, with each window having a size of N samples, with the cross-correlating being performed iteratively in a block-by-block fashion until a stop criterion is reached, with the starting points of two consecutive blocks of correlation being separated by 2N samples, and for each iteration the cross-correlating comprising:

a) initializing contents of an accumulation register capable of storing N data;
  b) taking a first group of N samples of the incident pulsed signal starting from the starting point of the corresponding block increased by a time shift of a first pulse;
  c) multiplying the first group by the polarity of the first pulse;
  d) adding the resulting group of N samples to the contents of the accumulation register; and
  e) repeating steps b) to d) for all the L pulses.

3. A method according to claim 1, wherein the training sequence is periodic and comprises at least M+1 replicas, with each replica having a size of N samples and containing L pulses, with M being a sub-multiple of N greater than or equal to 2, with the cross-correlating being performed iteratively in a block-by-block fashion until a stop criterion is reached, the computation of each block being split into M slices which are computed by algebraically summing windows N/M samples long.

4. A method according to claim 3, wherein the incident signal carries information within a super frame, each super frame containing the preamble including at least M+1 synchronization slots corresponding respectively to the replicas of the training sequence, and each slice being computed using one synchronization slot.

5. A method according to claim 4, wherein the starting points of two consecutive blocks of correlation are separated by N+N/M samples, with each iteration the cross-correlating comprising:

a) initializing contents of an accumulation register capable of storing N/M data;
  b) taking a first group of N/M samples of the incident pulsed signal starting from the starting point of the corresponding block increased by a time shift of a first pulse;
  c) multiplying the first group by the polarity of the first pulse;
  d) adding the resulting group of N/M samples to the contents of the accumulation register; and
  e) repeating steps b) to d) for all the L pulses.

6. A method according to claim 3, wherein the incident pulsed signal carries information within a super frame, with each super frame containing the preamble including at least M+1 synchronization slots corresponding respectively to the replicas of the training sequence, and each slice being computed using several adjacent synchronization slots belonging to several consecutive super frames.

7. A method according to claim 6, wherein after each correlation iteration, further comprising comparing the contents of the accumulation register with a first threshold; and wherein the stop criterion comprises detecting at least one peak of the accumulation register having a value greater than the first threshold or a maximum number of correlation iterations.

8. A method according to claim 7, wherein the detecting comprises a first step of detecting one replica of the training sequence, the first step comprising storing in a memory the position of each peak in the accumulation register as well as its sign.

9. A method according to claim 8, wherein the preamble contains an additional flipped last replica of the training sequence; and wherein the detecting further comprises a second step of sequentially scanning the next replicas until the flipped last replica is found.

10. A method according to claim 9, wherein scanning a next replica comprises:

performing a correlation between the next replica and the training sequence; and
  comparing a result of the correlation with a second threshold, and if the absolute value of the correlation result exceeds the second threshold, using the sign of the correlation result and the sign of each detected peak to decide whether the next replica is the last one or if the scanning operation is to be performed with the replica following the next replica.

11. A method according to claim 2, wherein after each correlation iteration, further comprising comparing the contents of the accumulation register with a first threshold; and wherein the stop criterion comprises detecting at least one peak of the accumulation register having a value greater than the first threshold or a maximum number of correlation iterations.

12. A method according to claim 11, wherein the detecting comprises a first step of detecting one replica of the training sequence, the first step comprising storing in a memory the position of each peak in the accumulation register as well as its sign.

13. A method according to claim 12, wherein the preamble contains an additional flipped last replica of the training sequence; and wherein the detecting further comprises a second step of sequentially scanning the next replicas until the flipped last replica is found.

14. A method according to claim 13, wherein scanning a next replica comprises:

performing a correlation between the next replica and the training sequence; and
  comparing a result of the correlation with a second threshold, and if the absolute value of the correlation result exceeds the second threshold, using the sign of the correlation result and the sign of each detected peak to decide whether the next replica is the last one or if the scanning operation is to be performed with the replica following the next replica.

15. A method according to claim 1, wherein the wireless data communications system comprises a wireless personal area network of the piconet type.

16. A data device comprising:

a receiver for receiving an incident pulsed signal of an ultra wide band type over a channel, the incident pulsed signal comprising a preamble including a training sequence having a series of pulses whose polarity and time shifts are defined by respective polarity and time-hopping codes; and
  a synchronizer comprising
    a cross-correlation circuit for performing a cross-correlation of the incident pulsed signal with the training sequence, the cross-correlating including algebraically summing in accordance with a polarity code, windows of the incident pulsed signal, with starting points of the windows being determined by the time-hopping code, and a detection circuit for detecting an end point of the preamble based upon a result of the cross-correlation performed by said cross-correlation circuit.

17. A data device according to claim 16, wherein the training sequence is periodic and comprises replicas, with each training sequence having a size of N samples and containing L pulses, with each window having a size of N samples, and said cross-correlation circuit performing the cross-correlating iteratively in a block-by-block fashion until a stop criterion is reached, the starting points of two consecutive blocks of correlation being separated by 2N samples, said cross-correlation circuit comprising:

an accumulation register for storing N data; and a processor adapted, for each iteration, to perform the following:
  a) initializing contents of said accumulation register,
  b) taking a first group of N samples of the received incident pulsed signal starting from the starting point of the corresponding block increased by the time shift of a first pulse,
  c) multiplying the first group by the polarity of the first pulse,
  d) adding a resulting group of N samples to the contents of said accumulation register, and
  e) repeating steps b) to d) for all the L pulses.

18. A data device according to claim 16, wherein the training sequence is periodic and comprises at least M+1 replicas, with each replica having a size of N samples and containing L pulses, with M being a sub-multiple of N greater than or equal to 2; and wherein said cross-correlation circuit performs the cross-correlating iteratively in a block-by-block fashion until a stop criterion is reached, the computation of each block being split into M slices which are computed by algebraically summing windows N/M samples long.

19. A data device according to claim 18, wherein the incident pulsed signal carries information within a super frame, each super frame containing the preamble including at least M+1 synchronization slots corresponding respectively to the replicas of the training sequence; and wherein said cross-correlation circuit computes each slice using one synchronization slot.

20. A data device according to claim 19, wherein the starting points of two consecutive blocks of correlation are separated by N+N/M samples, said cross-correlation circuit comprising an accumulation register for storing N/M data, and a processor adapted for each iteration to perform the following:
  a) initializing the contents of said accumulation register;
  b) taking a first group of N/M samples of the incident pulsed signal starting from the starting point of the corresponding block increased by the time shift of a first pulse;
  c) multiplying the first group by the polarity of the first pulse;
  d) adding the resulting group of N/M samples to the contents of said accumulation register; and
  e) repeating sub-steps b) to d) for all the L pulses.

21. A data device according to claim 19, wherein the incident pulsed signal carries information within a super frame structure, with each super frame containing the preamble including at least M+1 synchronization slots corresponding respectively to the replicas of the training sequence; and wherein said cross-correlation circuit computes each slice using several adjacent synchronization slots belonging to several consecutive super frames.

22. A data device according to claims 21, wherein said cross-correlation circuit comprises a comparator for comparing after each correlation iteration, the contents of said accumulation register with a first threshold, and wherein the stop criterion comprises detecting at least one peak of said accumulation register having a value greater than the first threshold or a predetermined maximum number of correlation iterations.

23. A data device according to claim 22, wherein said detection circuit comprises a memory and a store memory (STM) for storing in said memory a position of each peak in said accumulation register as well as its sign.

24. A data device according to claim 23, wherein the preamble contains an additional flipped last replica (LFR) of the training sequence; and wherein said detection circuit comprising a scanning circuit for sequentially scanning the next replicas until the flipped last one is found.

25. A data device according to claim 24, wherein said scanning circuit comprises:
  a correlation circuit for performing a correlation between the next replica and the training sequence; and
  a comparison means (CMPX) for comparing the correlation result with a second threshold; and
  a control circuit (CTLM) for, if an absolute value of the correlation result exceeds the second threshold, using a sign of the correlation result and a sign of each detected peak to decide whether the next replica is the last one or if the scanning operation is to be performed with the replica following the next replica.

26. A data device according to claims 17, wherein said cross-correlation circuit comprises a comparator for comparing after each correlation iteration, the contents of said accumulation register with a first threshold, and wherein the stop criterion comprises detecting at least one peak of said accumulation register having a value greater than the first threshold or a predetermined maximum number of correlation iterations.

27. A data device according to claim 26, wherein said detection circuit comprises a memory and a store memory (STM) for storing in said memory a position of each peak in said accumulation register as well as its sign.

28. A data device according to claim 27, wherein the preamble contains an additional flipped last replica (LFR) of the training sequence; and wherein said detection circuit comprising a scanning circuit for sequentially scanning the next replicas until the flipped last one is found.

29. A data device according to claim 28, wherein said scanning circuit comprises:
  a correlation circuit for performing a correlation between the next replica and the training sequence; and
  a comparison means (CMPX) for comparing the correlation result with a second threshold; and
  a control circuit (CTLM) for, if an absolute value of the correlation result exceeds the second threshold, using a sign of the correlation result and a sign of each detected peak to decide whether the next replica is the last one or if the scanning operation is to be performed with the replica following the next replica.

30. A data device according to claim 16, wherein the data device operates in a wireless data communications system comprising a wireless personal area network of the piconet type.

31. A wireless data communications system comprising:
a plurality of data devices, each data device comprising
  a receiver for receiving an incident pulsed signal of an ultra wide band type over a channel, the incident pulsed signal comprising a preamble including a training sequence having a series of pulses whose polarity and time shifts are defined by respective polarity and time-hopping codes, and
  a synchronizer comprising
    a cross-correlation circuit for performing a cross-correlation of the incident pulsed signal with the training sequence, the cross-correlating including algebraically summing in accordance with a polarity code, windows of the incident pulsed signal, with starting points of the windows being determined by the time-hopping code, and
    a detection circuit for detecting an end point of the preamble based upon a result of the cross-correlation performed by said cross-correlation circuit.

32. A wireless data communications system according to claim 31, wherein the training sequence is periodic and comprises replicas, with each training sequence having a size of N samples and containing L pulses, with each window having a size of N samples, and said cross-correlation circuit performing the cross-correlating iteratively in a block-by-block fashion until a stop criterion is reached, the starting points of two consecutive blocks of correlation being separated by 2N samples, said cross-correlation circuit comprising:
  an accumulation register for storing N data; and
  a processor adapted, for each iteration, to perform the following:
    a) initializing contents of said accumulation register,
    b) taking a first group of N samples of the received incident pulsed signal starting from the starting point of the corresponding block increased by the time shift of a first pulse,
    c) multiplying the first group by the polarity of the first pulse,
    d) adding a resulting group of N samples to the contents of said accumulation register, and
    e) repeating steps b) to d) for all the L pulses.

33. A wireless data communications system according to claim 31, wherein the training sequence is periodic and comprises at least M+1 replicas, with each replica having a size of N samples and containing L pulses, with M being a sub-multiple of N greater than or equal to 2; and wherein said cross-correlation circuit performs the cross-correlating iteratively in a block-by-block fashion until a stop criterion is reached, the computation of each block being split into M slices which are computed by algebraically summing windows N/M samples long.

34. A wireless data communications system according to claim 33, wherein the incident pulsed signal carries information within a super frame, each super frame containing the preamble including at least M+1 synchronization slots corresponding respectively to the replicas of the training sequence; and wherein said cross-correlation circuit computes each slice using one synchronization slot.

35. A wireless data communications system according to claim 34, wherein the starting points of two consecutive blocks of correlation are separated by N+N/M samples, said cross-correlation circuit comprising an accumulation register for storing N/M data, and a processor adapted for each iteration to perform the following:
  a) initializing the contents of said accumulation register;
  b) taking a first group of N/M samples of the incident pulsed signal starting from the starting point of the corresponding block increased by the time shift of a first pulse;
  f) multiplying the first group by the polarity of the first pulse;
  g) adding the resulting group of N/M samples to the contents of said accumulation register; and
  h) repeating sub-steps b) to d) for all the L pulses.

36. A wireless data communications system according to claim 31, wherein the wireless data communications system comprises a wireless personal area network of the piconet type.

* * * * *

UNITED STATES PATENT AND TRADEMARK OFFICE
CERTIFICATE OF CORRECTION

PATENT NO. : 7,254,202 B2  Page 1 of 1
APPLICATION NO. : 10/814824
DATED : August 7, 2007
INVENTOR(S) : Cattaneo et al.

It is certified that error appears in the above-identified patent and that said Letters Patent is hereby corrected as shown below:

Column 5, Line 63   Delete: "a independent"
                    Insert: -- an independent --

Column 6, Line 15   Delete: "FRi"
                    Insert: -- $FR_i$ --

Column 8, Line 38   Delete: "$W_n$"
                    Insert: -- $w_n$ --

Column 9, Line 52   Delete: "$W_n^{(i,f)}$"
                    Insert: -- $W_n^{(i,j)}$ --

Column 10, Line 62  Delete: "$W^{n\,(i,k,j)}$"
                    Insert: -- $W_n^{(i,k,j)}$ --

Column 11, Line 35  Delete: "102 1010"
                    Insert: -- 102, 1010 --

Column 18, Line 34  Delete: "claims"
                    Insert: -- claim --

Signed and Sealed this

Sixth Day of May, 2008

JON W. DUDAS
*Director of the United States Patent and Trademark Office*